United States Patent [19]

Bergmann et al.

[11] Patent Number: 5,328,608
[45] Date of Patent: Jul. 12, 1994

[54] MUTLI-LATERAL FILTER UNDERDRAIN BLOCK

[75] Inventors: Eugen O. Bergmann, Butler County; Marvin A. Brown, Allegheny County; Beverly Richard P., Butler County, all of Pa.

[73] Assignee: The F.B. Leopold Co., Inc., Zelienople, Pa.

[21] Appl. No.: 889,176

[22] Filed: May 27, 1992

[51] Int. Cl.$^5$ .......................... B01D 24/12; B01D 24/22
[52] U.S. Cl. .................................... 210/274; 210/275; 210/293
[58] Field of Search ...................... 210/274, 275, 293

[56] References Cited

U.S. PATENT DOCUMENTS

| | | | |
|---|---|---|---|
| 308,575 | 11/1984 | Puffer . | |
| 417,405 | 12/1889 | Coffey . | |
| 477,727 | 6/1892 | Williamson . | |
| 727,230 | 5/1903 | Underwood . | |
| 1,572,398 | 2/1926 | Leopold . | |
| 1,668,205 | 5/1928 | Hughes . | |
| 1,788,383 | 1/1931 | Delery . | |
| 2,378,239 | 6/1945 | Myron | 210/148 |
| 2,874,844 | 2/1959 | Wanner | 210/150 |
| 3,110,667 | 11/1963 | Stuppy | 210/275 |
| 3,468,422 | 9/1969 | Camp | 210/274 |
| 3,512,649 | 5/1970 | Nebolsine et al. | 210/274 |
| 4,065,391 | 12/1977 | Farabaugh | 210/274 |
| 4,118,322 | 10/1978 | San Roman | 210/136 |
| 4,202,774 | 5/1980 | Kos | 210/274 |
| 4,619,765 | 10/1986 | Roberts | 210/289 |
| 4,707,257 | 11/1987 | Davis et al. | 210/274 |
| 4,925,556 | 5/1990 | Gaudin et al. | 210/293 |
| 5,019,259 | 5/1991 | Hambley | 210/274 |
| 5,068,034 | 11/1991 | Walter | 210/232 |
| 5,087,362 | 2/1992 | Brown | 210/293 |
| 5,108,627 | 4/1992 | Berkebile et al. | 210/793 |

FOREIGN PATENT DOCUMENTS 55-20644  2/1980  Japan ..................... 210/293

OTHER PUBLICATIONS

Herbert E. Hudson, Jr. publication in the textbook "Water Clarification Processes", Chapter 15, 1981.

*Primary Examiner*—Ivars Cintins
*Attorney, Agent, or Firm*—Webb Ziesenheim Bruening Logsdon Orkin & Hanson

[57] ABSTRACT

An improvement for a filter system which distributes backwash fluid uniformly throughout a bed of granular media is disclosed. The filter system includes a distributor positioned beneath and supporting the media, with the distributor having a plurality of walls which define a primary horizontal conduit and a secondary horizontal conduit. At least one of the walls which define the conduits contains metering orifices that connect the primary conduit to the secondary conduit. The improvement includes at least one baffle positioned within the primary conduit to facilitate uniform flow of backwash fluid from the primary conduit through the metering orifices into the secondary conduit. The baffle may comprise flanges extending from the walls which define the primary conduit normal to a fluid flow direction in the conduit. Alternatively, the baffle may include posts positioned within the conduit. The baffle generally reduces flow velocity near the wall which contains the metering orifices to enhance distribution of backwash fluids from the primary conduit to the secondary conduit. The baffle is preferably located near an inlet for the primary conduit, which is the high energy portion of the conduit. The invention also includes tubular inserts which may be placed in the metering orifices to assist backwash fluid flow in making the 90 degree turn from the primary conduit into the metering orifices.

14 Claims, 3 Drawing Sheets

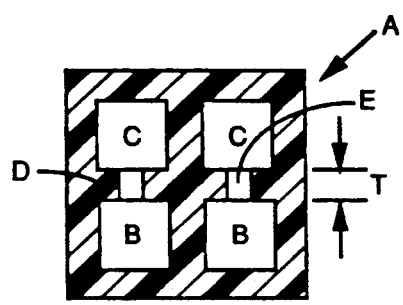
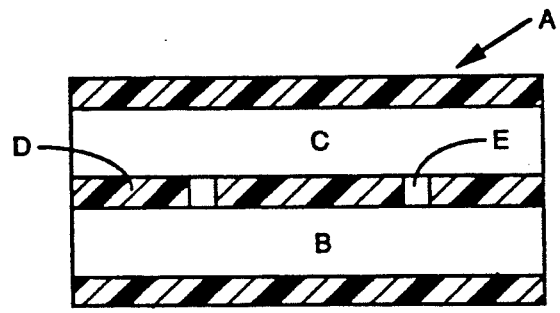
FIG. 1 PRIOR ART  FIG. 2 PRIOR ART
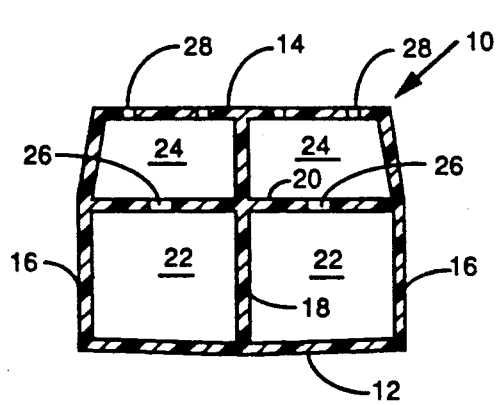
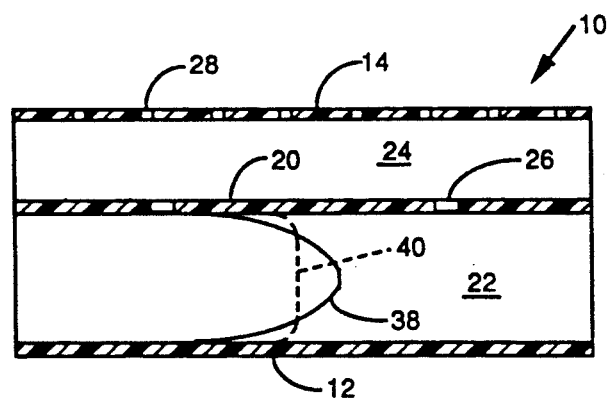
FIG. 3 PRIOR ART  FIG. 4 PRIOR ART

MUTLI-LATERAL FILTER UNDERDRAIN BLOCK

BACKGROUND OF THE INVENTION

1. Field of the Invention

This invention relates to underdrains in gravity filters and, more particularly, to an improvement for uniformly distributing backwash fluids into filter media using multi-lateral underdrains.

2. Description of the Prior Art

Various underdrain lateral designs for distributing backwash fluids, primarily water and, more recently, air/water mixtures, to filter media are well-known in the art. Three early dual lateral designs which proved successful are disclosed in U.S. Pat. No. 1,572,398 to Leopold, U.S. Pat. No. 2,378,239 to Myron and U.S. Pat. No. 3,110,667 to Stuppy, all of which are incorporated herein by reference. The general nature of these prior art designs is shown in FIGS. 1 and 2 of the drawings in the present application. Thus, FIGS. 1 and 2 show a filter block A having a plurality of walls which define two lower primary conduits B and two upper secondary conduits C. The primary and secondary conduits are separated by an interior wall D having a thickness T and also having metering orifices E therein for flow of backwash fluids from the primary conduits B into the secondary conduits C.

The blocks A are placed end-to-end in parallel, adjacent rows across a filter bottom and transverse to a flume to define underdrain laterals. The underdrain blocks A have been predominately made from clay or concrete. The thickness of the interior wall D in these designs is generally on the order of ⅜-1 inch.

FIGS. 3 and 4 of the drawings also show a dual lateral underdrain block 10 according to the prior art. Underdrain block 10 has a bottom wall 12, a top wall 14 with two sidewalls 16 extending therebetween. A vertical partition 18 is located within underdrain block 10 and extends between bottom wall 12 and top wall 14. A horizontal platform 20 extends between sidewalls 16. Partition 18 and platform 20 cooperate to define two lower primary horizontal conduits or "laterals" 22 and two upper secondary horizontal conduits 24. Horizontal platform 20 contains a plurality of metering orifices 26 which connect primary conduits 22 with secondary conduits 24. Top wall 14 contains a plurality of dispersion orifices 28 which connect the secondary conduits 24 with an overlying bed of granular media (not shown). Similar multi-lateral underdrain systems are shown in U.S. Pat. No. 4,065,391 to Farabaugh; U.S. Pat. No. 5,019,259 to Hambley; U.S. Pat. No. 5,068,034 to Walter; U.S. Pat. No. 4,691,765 to Roberts; and U.S. patent application Ser. No. 07/649,448, all of which are incorporated herein by reference. The invention described hereinafter may be applied to each of these multi-lateral underdrain systems.

According to Manifold Theory, as taught by Herbert E. Hudson, Jr. in the textbook *Water Clarification Processes*, Chapter 15, 1981, flow from a manifold, such as primary conduits B, into a perpendicular take-off conduit, such as orifices E, is impacted by the magnitude of the angle of repose of the manifold flow velocity as it enters the take-off conduits. The angle of repose is determined by the resolution of the vertical and horizontal components of the velocity. The uniformity of flow from manifold to take-off conduits generally improves as the angle of repose approaches 90 degrees with respect to the longitudinal axis of the manifold. The prior art clay and concrete underdrains have sufficient wall thickness and create enough frictional flow losses so that (a) the velocity within primary conduits B adjacent wall D is not unacceptably high, and (b) the angle of repose of flow velocity when entering orifices E does approach 90 degrees.

Today, it has been found desirable to mold underdrain blocks from plastic materials by foam or injection molding techniques. This generally provides for smaller wall thicknesses, on the order of 0.060-0.125 inches, and higher flow velocities at the interior wall D in which the metering orifices E are located. The ratio of the diameter of the metering orifices to the wall thickness can reach 2:1 or more, whereas the same ratio for prior art clay and tile underdrain blocks was approximately 1:1. The angle of repose of flow velocity as it enters the orifices E is generally less than 45 degrees. Maldistribution from the primary conduits B into the secondary conduits C under these circumstances is frequently encountered. The primary conduit metering orifice arrangement can no longer approximate a manifold and maldistribution can be as high as $+/-$ 15% or more. Maldistribution of $+/-$ 5% can be obtained in clay or concrete underdrains in some cases.

Attempts have been made to control fluid flow in modern day underdrain designs. For example, U.S. Pat. Nos. 417,405; 477,727; 1,668,205; 1,788,383; 4,118,322; 4,202,774; and 4,925,556 have addressed the problem either directly or indirectly.

Thus, it is an object of the present invention to improve backwash fluid distribution in today's thin-walled underdrain systems. It is a further object to meet and surpass the performance of prior art clay and concrete dual lateral underdrains with respect to maldistribution and headloss.

SUMMARY OF THE INVENTION

Accordingly, we have invented an improvement for a filter system to distribute backwash fluid uniformly throughout a bed of granular media. The filter system includes a distributor positioned beneath and supporting the media, and the distributor has a plurality of walls which define a primary horizontal conduit and a secondary horizontal conduit. At least one of the walls contains metering orifices that connect the primary conduit to the secondary conduit. The system also includes means for introducing backwash fluid into the primary conduit.

The improvement comprises at least one baffle positioned within the primary conduit to facilitate uniform flow of backwash fluid from the primary conduit through the metering orifices into the secondary conduit. The baffle is preferably located near an inlet for the primary conduit. In one embodiment, the baffle may comprise a flange which is positioned within the primary conduit normal to a fluid flow direction in the conduit. The flange may be contiguous with at least one of the walls or all of the walls which define the primary conduit.

The baffle may also comprise at least one post upwardly extending within the primary conduit, with an upper end of the post preferably coterminus with a maximum vertical dimension of the primary conduit. The post may have a flow impingement face normal to a fluid flow direction in the primary conduit, and further preferred embodiments may include both flanges and posts.

Another embodiment of the invention includes a tubular insert positioned within at least one metering orifice to facilitate flow of backwash fluids from the primary conduit to the secondary conduit. Particularly, the walls in the distributor containing the metering orifices have a thickness, t and the insert has an inner diameter, d and a length, l. The invention contemplates that the length, l of the insert, is greater than the thickness, t of the wall, with the length of the insert equal to or greater than the inside diameter, d of the insert.

All three aspects of the invention may be utilized to form a complete underdrain system wherein a combination of flanges and posts are positioned at various locations in the primary conduits and inserts are placed in metering orifices to optimize headloss and maldistribution for a particular system design. It is expected that such combinations will be particularly applicable to systems wherein the primary conduits extend to upwards of 5-50 feet in length from flume to filter sidewall.

Further aspects and advantages of the invention will become apparent from the following detailed description in conjunction with the accompanying drawings.

BRIEF DESCRIPTION OF THE DRAWINGS

FIG. 1 is an end sectional view showing a prior art underdrain block;

FIG. 2 is a side sectional view of the prior art underdrain block of FIG. 1;

FIG. 3 is an end sectional view of a more recent, thin-walled prior art underdrain block;

FIG. 4 is a side sectional view of the underdrain block of FIG. 3, including legends which diagram fluid velocity gradients within the underdrain block;

DETAILED DESCRIPTION OF THE PREFERRED EMBODIMENTS

FIGS. 5-10 show three embodiments of a dual lateral underdrain block 10 according to the present invention.

Figure 7:
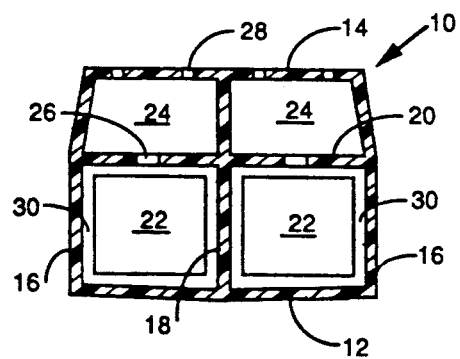
FIG. 7 is an end sectional view of the underdrain block of FIG. 3 having flanges according to the present invention.
Figure 8:
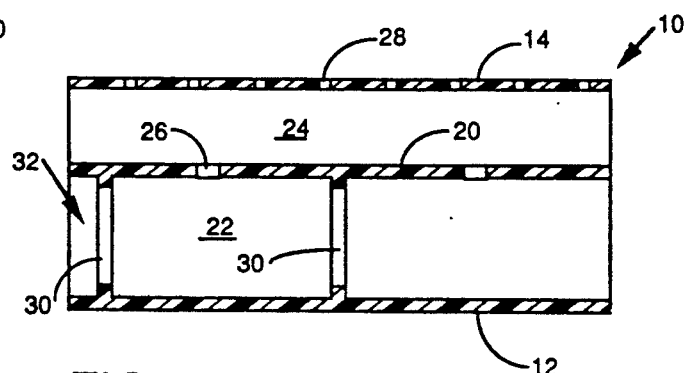
FIG. 8 is a side sectional view of the underdrain block of FIG. 7.

FIGS. 7-8 show a first embodiment of the invention wherein a flange 30 is positioned within each primary conduit 22 of the underdrain block 10 substantially normal to the longitudinal axis of the primary conduit. A flange is preferably located near an inlet 32 for each primary conduit 22 since the inlet is the high energy portion of the conduit. The flange 30 is contiguous with portions of the bottom wall 12, sidewalls 16, partition 18 and platform 20 which define primary conduits 22. Although the embodiment shown has the flange 30 contiguous with all these walls, the flange 30 may simply extend into the primary conduit 22 from one or more of these walls, for example as a fixed flap extending downward into primary conduit 22 from horizontal platform 20. The flange 30 essentially functions as a baffle within primary conduits 22 to convert velocity energy into head energy, as discussed below. The flange may be conveniently molded with the entire underdrain block 10, or with particular pieces thereof, and various flange arrangements may be more suitable for a particular underdrain design. It is anticipated that one flange 30 per four foot underdrain block 10 will be the standard arrangement.

Figure 9:
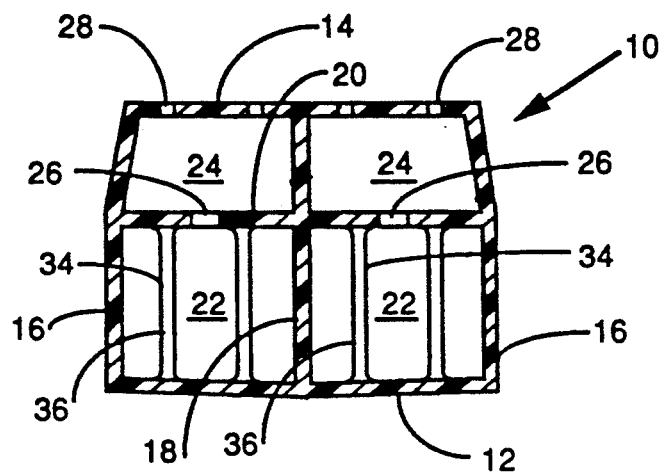
FIG. 9 is an end sectional view of the underdrain block of FIG. 3 having posts according to the present invention.
Figure 10:
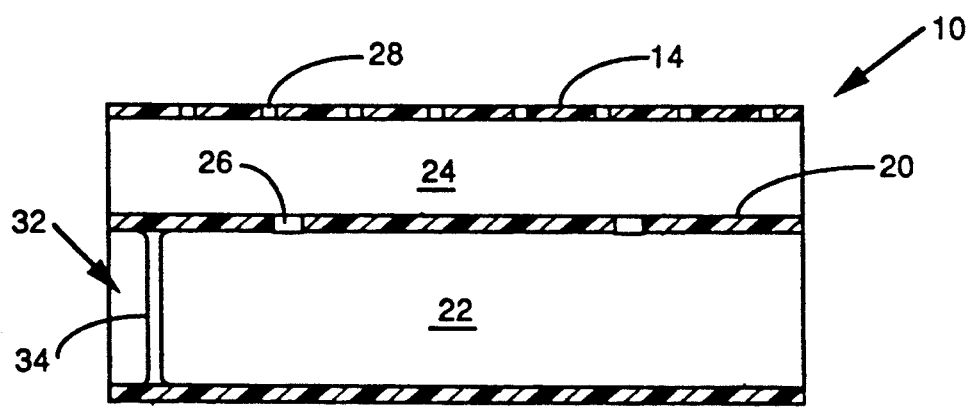
FIG. 10 is a side sectional view of the underdrain block of FIG. 9.

FIGS. 9-10 show a second embodiment of the invention wherein two upstanding posts 34 are centrally located within each primary conduit 22 adjacent the inlet 32 for each conduit. Each post has a flow impingement face 36 which is normal to the longitudinal axis of the primary conduit 22. As shown, the posts 34, extend between the bottom wall 12 and the horizontal platform 20, although other arrangements are possible. It is generally preferable that the posts 34 are at least contiguous with the platform 20 so that flow adjacent the platform may be affected. As with flanges 30, posts 34 act as a baffle within conduits 22 to convert velocity energy into head energy. It is anticipated that one set of posts 34 per four foot underdrain block 10 would be the standard arrangement. The posts may be molded along with the underdrain blocks 10 or may be installed in a retrofit manner by fusion welding, snap-in or other suitable attachment. It is anticipated that the posts would generally be of solid construction and of rectangular cross-section.

An alternative arrangement (not shown) could include one post 34 within each primary conduit 22, each post aligned with the metering orifices 26 to maximize the baffling effect upstream of the orifices. Other arrangements more suitable for particular underdrain designs are possible and are intended to be within the scope of the invention.

In operation, the underdrain blocks 10 are placed end-to-end in parallel, adjacent rows across a filter bottom. Backwash fluid, primarily water and more recently, an air/water mixture, is introduced to the primary conduits 22 from a flume. In the case of the flanges 30, areas of lower fluid velocity are created downstream of the flanges, particularly in the "shadow" of the flanges adjacent platform 20. This reduces the horizontal component of flow velocity through the primary conduits 22. Consequently, the angle of repose of flow velocity through orifices 26 tends toward 90 degrees with respect to the longitudinal axis of the primary conduit 22. This insures that backwash fluid flow does not simply slip over the relatively thin platform 20 at the orifices 26, continuing with a predominantly horizontal velocity.

Referring to FIG. 4, velocity profile 38 shows the velocity gradient within primary conduit 22 for prior art clay and concrete dual lateral underdrains. Velocity profile 40 is representative of plastic underdrain blocks which do not have baffles 30, 34 according to the invention. It will be apparent that a lower mean velocity within primary conduits 22 is achieved by the clay or concrete underdrains. Profile 40 shows that velocity near the platform 20 in prior art plastic underdrains is higher than for clay underdrains. The invention tends to cause profile 40 to approximate profile 38 when flow passes baffles 30, 34. Thus, mean velocity within the primary conduits 22 is lowered, and the backwash fluid, when entering metering orifices 26, will now have a larger vertical velocity component. The angle of repose will tend to approach 90 degrees.

More particularly, the baffles 30, 34 provide a tapered flow effect within primary conduits 22 despite the fact that metering orifices 26 may all be of the same diameter. In conduits without baffles, incoming backwash fluid sees little frictional resistance, especially in plastic underdrains. This promotes flow of the fluids straight back to the far end of the primary lateral before turning upwards to proceed through metering orifices 26. This causes a "choking off" effect with respect to the metering orifices 26 located near the primary conduit inlet 32. Each baffle 30, 34 converts velocity energy into head energy as the backwash fluid proceeds down primary conduits 22. Thus, a larger portion of the backwash fluid enters the orifices 26 which are located near the inlet 32. Backwash fluid flow is therefore more uniform and the tendency of backwash fluid to proceed directly to the far end of the primary conduits 22 is controlled.

It is preferred that the flanges 30 or posts 34 are solid and are fixedly located within primary conduits 22, such as when they are molded along with the underdrain block 10. A solid, fixed construction of the flanges 30 or posts 34 prevents chattering or undue vibration within the underdrain during backwash. Such constructions are also more resistant to deformation or wear under high backwash pressures.

Figure 5:
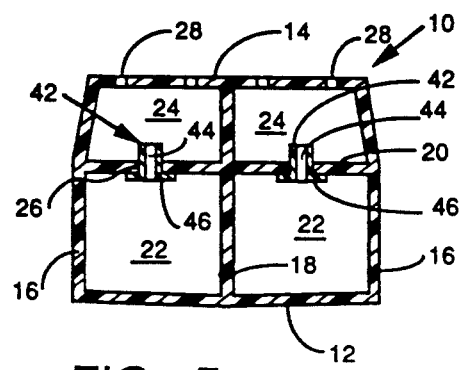
FIG. 5 is an end sectional view of the underdrain block of FIG. 3, including tubular inserts according to the present invention.
Figure 6:
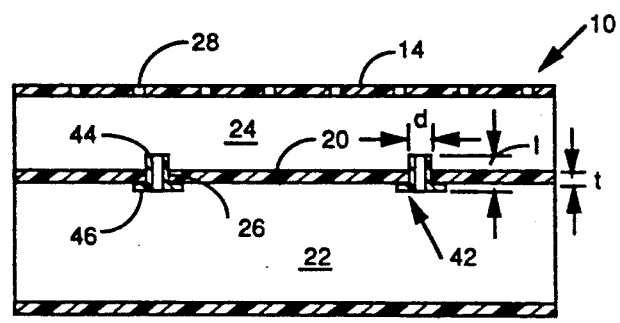
FIG. 6 is a side sectional view of the underdrain block of FIG. 5.

FIGS. 5-6 show a third embodiment of the invention wherein a tubular insert 42 is placed within each metering orifice 26 in horizontal platform 20. The tubular inserts have an upstanding body 44 with an insert flange 46 which abuts horizontal platform 20. Importantly, a length, l of the body 44 is greater than a thickness, t of platform 20, and length, l is greater than or equal to the inside diameter, d of the insert 42. It has been found that such dimensions assist in turning flow from the primary conduit 22 into metering orifices 26 so that the angle of repose of flow velocity approaches 90 degrees with respect to horizontal. Thus, backwash distribution performance of the modern thin-walled, plastic underdrain blocks is greatly improved. A combination of one or more of the above three aspects of the invention may be utilized simultaneously to optimize headloss and maldistribution in a particular underdrain system.

A study was conducted measuring headloss and maldistribution in both prior art clay underdrain blocks and plastic underdrain blocks having flanges 30 according to the invention. Particularly, the ratio of the inside diameter, d to the wall thickness, T in the clay block was less than 1.0 whereas the same ratio for the plastic block was greater than 1.0. Table 1, below, illustrates the results as follows:

TABLE 1

Clay Block Performance with d/T less than 1.0 (.833) versus Plastic Block Performance with d/T greater than 1.0 (2.625) Utilizing Baffles

| BACKWASH FLOW RATE (GPM/ft$^2$) | CLAY | PLASTIC | % IMPROVEMENT |
|---|---|---|---|
| Headloss (Inches) in Typical 30 ft. Lateral | | | |
| 15 | 15.0 | 12.5 | 16.7 |
| 20 | 25.0 | 22.0 | 12.0 |
| 25 | 37.5 | 34.0 | 9.4 |
| Maldistribution(%) in Typical 30-ft. Lateral | | | |
| 15 | ±5.0 | ±4.0 | 20.0 |
| 20 | ±4.2 | ±3.0 | 28.6 |
| 25 | ±4.2 | ±2.0 | 52.4 |

Thus, it is clear that the present invention provides substantial improvement in performance with respect to both prior art clay underdrain blocks and more recent plastic underdrain blocks which have not been equipped with any aspects of the present invention. Particularly, distribution in dual lateral underdrains can be made more uniform at the same or lower headloss when compared to prior plastic underdrain blocks. The invention presents these advantages while being simple and practical to mold in plastic.

Having described the presently preferred embodiments of the invention, it will be apparent that it is not intended to limit the invention except within the scope of the following claims.

We claim:

1. In a filter system for distributing a backwash fluid uniformly throughout a bed of granular media, including:
   a distributor positioned beneath and supporting said media, said distributor having a plurality of walls defining a primary horizontal conduit and a secondary horizontal conduit, at least one of said walls containing metering orifices that connect said primary conduit to said secondary conduit; and
   a backwash fluid inlet for said primary conduit;
   the improvement comprising:
   at least one baffle positioned within said primary conduit to facilitate uniform flow of backwash fluid from said primary conduit through said metering orifices into said secondary conduit, said baffle comprising at least one flange positioned within said primary conduit normal to a fluid flow direction therein, said flange contiguous with at least one of the walls which define said primary conduit.

2. In a filter system for distributing a backwash fluid uniformly throughout a bed of granular media, including:
   a distributor positioned beneath and supporting said media, said distributor having a plurality of walls defining a primary horizontal conduit and a secondary horizontal conduit, at least one of said walls containing metering orifices and having a wall thickness, t;
   the improvement comprising:
   an insert for at least one of said metering orifices, said insert having an inside diameter, d and a length, l;
   wherein the length, l of said insert is greater than the thickness, t of said wall, with the length, l of said insert equal to or greater than the inside diameter, d of said insert.

3. The improvement of claim 2 further including a flange positioned within said primary conduit normal to a fluid flow direction in said primary conduit.

4. The improvement of claim 2 further including at least one post upwardly extending within said primary conduit.

5. In a filter system for distributing a backwash fluid uniformly throughout a bed of granular media, including:
   a distributor positioned beneath and supporting said media, said distributor having a plurality of walls defining a primary horizontal conduit and a secondary horizontal conduit, at least one of said walls containing metering orifices and having a wall thickness, t; and
   a backwash fluid inlet for said primary conduit;
   the improvement comprising:

at least one baffle positioned within said primary conduit to facilitate uniform flow of backwash fluid from said primary conduit through said metering orifices into said secondary conduit;

an insert for each of said metering orifices, said insert having an inside diameter, d and a length, l;

wherein the length, l of said insert is greater than the thickness, t of said wall, with the length, l of said insert equal to or greater than the inside diameter, d of said insert.

6. In a filter system for distributing a backwash fluid uniformly throughout a bed of granular media, including:

a distributor positioned beneath and supporting said media, said distributor having a plurality of walls defining a primary horizontal conduit and a secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said secondary conduit, said baffle comprising at least one flange positioned within said primary conduit normal to a fluid flow direction therein.

7. In a filter system for distributing a backwash fluid uniformly throughout a bed of granular media, including:

a distributor positioned beneath and supporting said media, said distributor having a plurality of walls defining a primary horizontal conduit and a secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said secondary conduit, said baffle comprising two posts adjacent one another centrally located within said primary conduit.

8. In a filter system for distributing a backwash fluid uniformly throughout a bed of granular media, including:

a distributor positioned beneath and supporting said media, said distributor having a plurality of walls defining a primary horizontal conduit and a secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said secondary conduit; and a tubular insert positioned within each metering orifice to facilitate flow of backwash fluid from said primary conduit to said secondary conduit.

9. In a filter system for distributing a backwash fluid uniformly throughout a bed of granular media, including:

a distributor positioned beneath and supporting said media, said distributor having a plurality of walls defining a primary horizontal conduit and a secondary horizontal conduit, at least one of said walls containing metering orifices that connect said primary conduit to said secondary conduit; and a backwash fluid inlet for said primary conduit;

the improvement comprising:

a baffle positioned within said primary conduit to facilitate flow of backwash fluid from said primary conduit through said metering orifices into said secondary conduit, said baffle comprising at least two posts upwardly extending within said primary conduit, said posts adjacent one another centrally located within said primary conduit.

10. In a filter system for distributing a backwash fluid uniformly throughout a bed of granular media, including:

a distributor positioned beneath and supporting said media, said distributor having a plurality of walls defining a primary horizontal conduit and a parallel secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said parallel secondary conduit, said baffle comprising at least one flange positioned within said primary conduit normal to a fluid flow direction therein.

11. In a filter system for distributing a backwash fluid uniformly throughout a bed of granular media, including:

a distributor positioned beneath and supporting said media, said distributor having a plurality of walls defining a primary horizontal conduit and a parallel secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said parallel secondary conduit, said baffle comprising at least one flange positioned within said primary conduit normal to a fluid flow direction therein;

said flange being contiguous with at least one of the walls which define said primary conduit.

12. In a filter system for distributing a backwash fluid uniformly throughout a bed of granular media, including:

a distributor positioned beneath and supporting said media, said distributor having a plurality of walls defining a primary horizontal conduit and a parallel secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said parallel secondary conduit;

said baffle comprising at least two posts, upwardly extending and adjacent one another, centrally located within said primary conduit.

13. In a filter system for distributing a backwash fluid uniformly throughout a bed of granular media, including:

a distributor positioned beneath and supporting said media, said distributor having a plurality of walls defining a primary horizontal conduit and a parallel secondary horizontal conduit, at least one of said walls containing metering orifices that connect said primary conduit to said secondary conduit; and a backwash fluid inlet for said primary conduit;

the improvement comprising:

at least one baffle positioned within said primary conduit to facilitate uniform flow of backwash fluid from said primary conduit through said metering orifices into said parallel secondary conduit; and a tubular insert positioned within each metering orifice to facilitate flow of backwash fluids from said primary conduit to said secondary conduit.

14. In a filter system for distributing a backwash fluid uniformly throughout a bed of granular media, including:

a distributor positioned beneath and supporting said media, said distributor having a plurality of walls defining a primary horizontal conduit and a parallel secondary horizontal conduit, at least one of said walls containing metering orifices that connect said primary conduit to said secondary conduit; and a backwash fluid inlet for said primary conduit;

the improvement comprising:

a baffle positioned within said primary conduit to facilitate flow of backwash fluid from said primary conduit through said metering orifices into said parallel secondary conduit, said baffle comprising at least two posts, upwardly extending and adjacent one another, centrally located within said primary conduit.

* * * * *